(12) United States Patent
Elango

(10) Patent No.: US 12,293,298 B2
(45) Date of Patent: May 6, 2025

(54) REDUCING TRAINING TIMES OF DEEP NEURAL NETWORKS THROUGH EFFICIENT HYBRID PARALLELISM

(71) Applicant: Baidu USA, LLC, Sunnyvale, CA (US)

(72) Inventor: Venmugil Elango, Redmond, WA (US)

(73) Assignee: Baidu USA LLC, Sunnyvale, CA (US)

( * ) Notice: Subject to any disclaimer, the term of this patent is extended or adjusted under 35 U.S.C. 154(b) by 762 days.

(21) Appl. No.: 16/985,121

(22) Filed: Aug. 4, 2020

(65) Prior Publication Data

US 2021/0133591 A1 May 6, 2021

Related U.S. Application Data

(60) Provisional application No. 62/930,518, filed on Nov. 4, 2019.

(51) Int. Cl.
*G06N 3/10* (2006.01)
*G06F 9/38* (2018.01)
*G06N 3/04* (2023.01)

(52) U.S. Cl.
CPC ............. *G06N 3/10* (2013.01); *G06F 9/3885* (2013.01); *G06N 3/04* (2013.01)

(58) Field of Classification Search
None
See application file for complete search history.

(56) References Cited

FOREIGN PATENT DOCUMENTS

| CN | 107688493 A | 2/2018 |
| CN | 108090565 A | 5/2018 |
| CN | 108292374 A | 7/2018 |
| WO | 2017083399 A2 | 5/2017 |
| WO | 2018125429 A1 | 7/2018 |

OTHER PUBLICATIONS

Ma et al., "NeuGraph: Parallel Deep Neural Network Computation on Large Graphs" (Jul. 2019) (Year: 2019).*
Jia et al., "Exploring Hidden Dimensions in Parallelizing Convolutional Neural Networks", (2018) (Year: 2018).*
Wu et al.,"Google's Neural Machine Translation System: Bridging the Gapbetween Human and Machine Translation," arXiv preprint arXiv:1609.08144, 2016. (23pgs).

(Continued)

*Primary Examiner* — Andrew J Jung
*Assistant Examiner* — Beatriz Ramirez Bravo
(74) *Attorney, Agent, or Firm* — Oppedahl Patent Law Firm LLC

(57) ABSTRACT

Presented are systems and methods to automatically find efficient parallelization strategies for deep neural networks (DNNs). A computation graph comprising an efficiently ordered sequence of vertices aids in computing the best parallelizing strategy in a relatively short time. Effectiveness of the parallelization strategies is evaluated on various DNNs, and the performance of the strategies proposed by various embodiments is compared against data parallelism, expert-designed strategies, and other state-of-the-art approaches. Experimental results demonstrate that the proposed strategies outperform a baseline data parallelism strategy and achieve better performance than expert-designed strategies and state-of-the-art approaches.

12 Claims, 11 Drawing Sheets

(56) References Cited

OTHER PUBLICATIONS

Keskar et al., "On large-batch training for deep learning: Generalization gap and sharp minima," arXiv preprint arXiv:1609.04836, 2017. (16 pgs).
Dean et al.,"Large scale distributed deep networks," in Advances in Neural Information Processing Systems 25 (NIPS), 2012. (9pgs).
A. Krizhevsky, "One weird trick for parallelizing convolutional neural networks," arXiv preprint arXiv:1404.5997, 2014. (7pgs).
Jia et al.,"Beyond Data and Model Parallelism for Deep Neural Networks," arXiv preprint arXiv:1807.05358, 2018. (15pgs).
Mirhoseini et al.,"Device Placement Optimization with Reinforcement Learning," arXiv preprint arXiv:1706.04972, 2017. (11pgs).
Jia et al.,"Exploring Hidden Dimensions in Parallelizing Convolutional Neural Networks," arXiv preprint arXiv:1802.04924, 2018. (11pgs).
M. Wolfe, "More iteration space tiling," [online], [Retrieved Mar. 25, 2021]. Retrieved from Internet <URL:http://doi.acm.org/10.1145/76263.76337> in Proceedings of the 1989 ACM/IEEE Conference on Supercomputing. [Abstract] (4pgs).
Huang et al.,"GPipe: Efficient Training of Giant Neural Networks using Pipeline Parallelism," arXiv preprint arXiv:1811.06965, 2018. (11pgs).
Elango et al.,"Diesel: DSL for Linear Algebra and Neural Net Computations on GPUs," in Proceedings of the 2nd ACM SIGPLAN International Workshop on Machine Learning and Programming Languages, ser. MAPL 2018. (11pgs).
Vasilache et al.,"Tensor Comprehensions: Framework-AgnosticHigh-Performance Machine Learning Abstractions," arXiv preprint arXiv:1802.04730, 2018. (37pgs).
Narayanan et al.,"PipeDream: Generalized Pipeline Parallelism for DNN Training," in Proceedings of the 27th ACM Symposium on Operating Systems Principles (SOSP), 2019. (15pgs).
Krizhevsky et al.,"ImageNet Classification with Deep Convolutional Neural Networks," in Advances in Neural Information Processing Systems 25, 2012. (9pgs).
Szegedy et al.,"Going deeper with convolutions," arXiv preprint arXiv:1409.4842, 2014. (12pgs).
Mikolov et al.,"Recurrent neural network based language model," in Eleventh annual conference of the international speech communication association, 2010. (4pgs).
Vaswani et al.,"Attention Is All You Need," arXiv preprint arXiv:1706.03762, 2017. (15pgs).
Deng et al.,"Imagenet:A large-scale hierarchical image database," in 2009 IEEE Conference on Computer Vision and Pattern Recognition [Abstract], 2009. (3pgs).
Chelba et al.,"One Billion Word Benchmark for Measuring Progress inStatistical Language Modeling," arXiv preprint arXiv:1312.3005, 2014. (6pgs).
"Workshop on statistical machine translation," [online], [Retrieved Mar. 25, 2021]. Retrieved from Internet <URL:http://www.statmt.org/wmt14/> (6pgs).
Shazeer et al., "Mesh-TensorFlow:Deep Learning for Supercomputers," arXiv preprint arXiv:1811.02084, 2018. (16pgs).
Mirhoseini et al., "A hierarchical model for device placement," in 6th International Conference on Learning Representations (ICLR), 2018. (11pgs).
Chinese Office Action dated Dec. 25, 2023, in Chinese Application No. 202011209924.4 (17pgs).

\* cited by examiner

100

200

300

Procedure GENERATESEQ $(G = (V, E))$
1: $\forall_{v \in V}, v.d \leftarrow N(v)$  // Right-dependent sets
2: $\forall_{v \in V}, v.t \leftarrow \emptyset$  // Terminal sets
3: $U \leftarrow V$  // Unsequenced nodes
4: $\mathcal{V} = (\bot_1, \ldots, \bot_{|V|})$
5:
6: for $i = 1$ to $|V|$ do
7: $\quad v^{(i)} \leftarrow \arg\min_{u \in U} |u.d|$  // Assign $i^{th}$ element of $\mathcal{V}$
8: $\quad U \leftarrow U - \{v^{(i)}\}$
9: $\quad$ for all $v \in v^{(i)}.d$ do
10: $\quad\quad v.d \leftarrow v.d \cup v^{(i)}.d - \{v, v^{(i)}\}$
11: $\quad\quad v.t \leftarrow v.t - v^{(i)}.t \cup \{v^{(i)}\}$
12: $\quad$ end for
13: end for
14: return $\mathcal{V}$

Procedure GETBESTSTRATEGY ($G = (V, E)$)
1: $\mathcal{V} \leftarrow$ GENERATESEQ($G$)                    // Refer Figure 3A
2: $\forall_{v \in \mathcal{V}}, v.tbl \leftarrow \varnothing$                                // DP table
3:
4: for $i = 1$ to $|\mathcal{V}|$ do
5:     // Compute all valid substrategies $\phi_{|D(\mathcal{V},i)}$
6:     $\Phi' \leftarrow \prod_{v \in \mathcal{V}_{<i,d}} \{(v, C) \mid C \in \mathcal{C}(v)\}$
7:
8:     for all $\phi' \in \Phi'$ do
9:         $\phi \leftarrow \varnothing$
10:        $min\_cost \leftarrow \top$
11:        for all $C \in \mathcal{C}(v^{(i)})$ do
12:            $\phi'' \leftarrow \phi' \cup \{(v^{(i)}, C)\}$
13:            $cost \leftarrow \mathcal{G}(\mathcal{V}, i, \phi'')$
14:            for all $v \in v^{(i)}.t$ do
15:                $cost \leftarrow cost + v.tbl(\phi''_{|v,d})$
16:            end for
17:            if $cost < min\_cost$ then
18:                $\phi \leftarrow \phi''$
19:                $min\_cost \leftarrow cost$
20:            end if
21:        end for
22:        $v^{(i)}.tbl \leftarrow v^{(i)}.tbl \cup \{(\phi, min\_cost)\}$
23:    end for
24: end for
25: return $v^{(|\mathcal{V}|)}.tbl$

```
┌─────────────────────────────────────────────┐
│ OBTAIN A SEQUENCE OF VERTICES IN WHICH A VERTEX │
│ REPRESENTS A LAYER OF A DEEP NEURAL NETWORK │
│ THAT HAVE BEEN ORDERED ACCORDING A VERTEX   │─ 405
│ ORDERING STRATEGY SUCH THAT SIZES OF        │
│ RESTRICTED NEIGHBOR SETS IN A COMPUTATION   │
│ GRAPH THAT REPRESENTS THE DNN ARE REDUCED   │
└─────────────────────────────────────────────┘
                        ↓
┌─────────────────────────────────────────────┐
│ FOR EACH VERTEX IN THE SEQUENCE OF VERTICES, USE │
│ A RECURRENCE TO COMPUTE SUBSTRATEGIES FOR   │
│ PARALLELIZING LAYERS OF THE DNN, EACH LAYER │─ 410
│ BEING ASSOCIATED WITH ONE OR MORE VALID     │
│ CONFIGURATIONS THAT REDUCE A CONFIGURATION  │
│ COST ACCORDING TO A COST FUNCTION           │
└─────────────────────────────────────────────┘
                        ↓
┌─────────────────────────────────────────────┐
│ OUTPUT THE STRATEGY HAVING THE LOWEST       │─ 415
│ CONFIGURATION COST FOR THE COMPUTATION GRAPH│
└─────────────────────────────────────────────┘
```

REDUCING TRAINING TIMES OF DEEP NEURAL NETWORKS THROUGH EFFICIENT HYBRID PARALLELISM

CROSS-REFERENCE TO RELATED APPLICATION

This patent application is related to and claims priority benefit under 35 USC § 119(e) to co-pending and commonly-owned U.S. Pat. App. No. 62/930,518, filed on 4 Nov. 2019, entitled "REDUCING TRAINING TIMES OF DEEP NEURAL NETWORKS THROUGH EFFICIENT HYBRID PARALLELISM," and listing Venmugil Elango as inventor, which patent document is incorporated by reference herein in its entirety and for all purposes.

BACKGROUND

The present disclosure relates generally to systems and methods for computer learning that can provide improved computer performance, features, and uses. More particularly, the present disclosure relates to systems and methods for reducing training times of deep neural networks (DNNs) through efficient hybrid parallelism techniques.

DNNs have achieved great successes in many domains, such as computer vision, natural language processing, recommender systems, etc. Training a DNN requires substantial computational and memory requirements. It has become a standard practice to parallelize training on multiple devices to reduce training times. There are several possible ways to parallelize different layers in a DNN. Exhaustively searching this list to find an optimal parallelization strategy is prohibitively time consuming and impractical. The standard practice is to use data parallelism because of its simplicity. However, data parallelism is often sub-optimal, and suffers from poor performance and high memory requirements. Expert-designed strategies have been proposed on a case-by-case basis using domain specific knowledge. These expert-designed strategies do not generalize well to DNNs other than those they were designed for.

Accordingly, it is desirable to provide more efficient systems and methods that increase hardware utilization and reduce training times of deep neural networks.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts an exemplary iteration space of a general matrix multiply (GEMM) computation that is parallelized using the parallelization configuration (1, 4, 2).

FIG. 3A depicts an exemplary process for ordering vertices into an efficient sequence, according to embodiments of the present disclosure.

FIG. 4A depicts a dynamic programming (DP) based process for computing an efficient strategy for a computation graph, according to embodiments of the present disclosure.

FIG. 4B depicts a flowchart illustrating a process for finding an efficient strategy for parallelizing vertices of a DNN to increase hardware utilization and reduce training time, according to embodiments of the present disclosure.

DETAILED DESCRIPTION OF EMBODIMENTS

Figure 1:
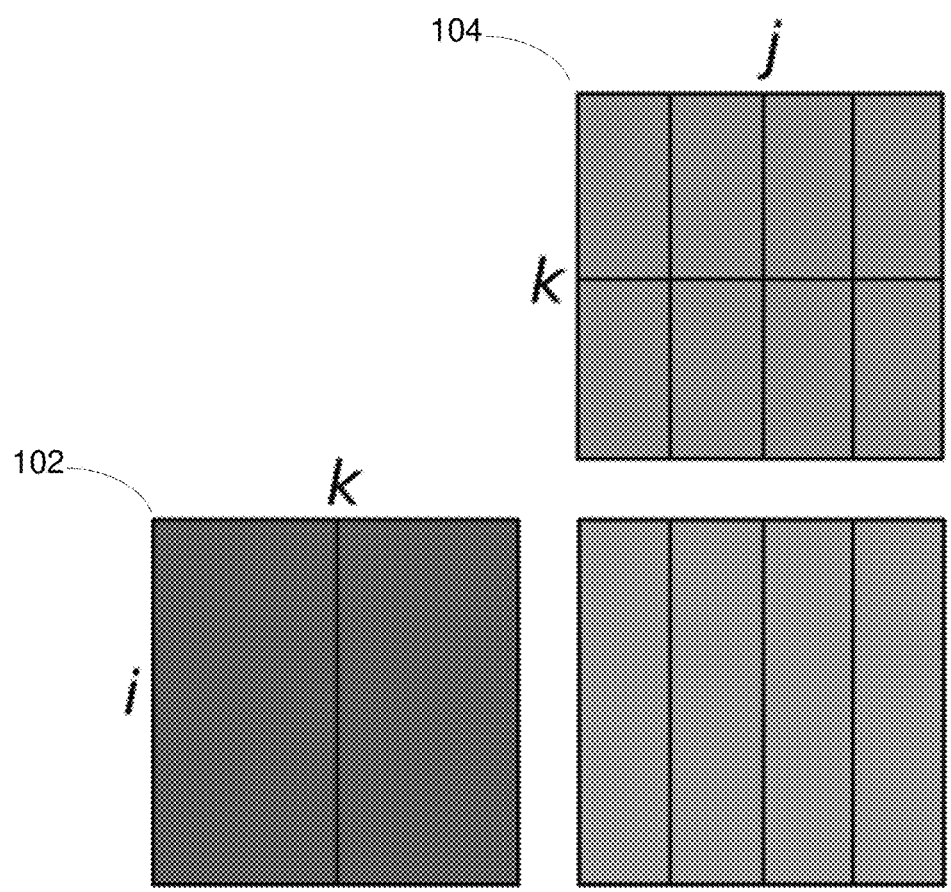

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items. A "layer" may comprise one or more operations. The words "optimal," "optimize," "optimization," "best," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

Deep neural networks are becoming increasingly sophisticated and use ever-increasing datasets to increase accuracy. This has led to an increase in computational and memory requirements to train DNNs. It typically takes from several hours to days and multiple GPUs to train a DNN. For instance, Google's neural machine translation (GNMT) model takes around six days to train on the Dataset3 English-to-French (EN→FR) when using 96 NVIDIA K80 GPUs.

Training a DNN typically involves three phases: forward propagation, backward propagation (or backprop), and an update phase. First, the input dataset is split into multiple mini-batches. During a step, a mini-batch is passed through the layers of the network during forward propagation. At the end of the forward phase, the output is compared against the ground truth, and a loss is computed using an appropriate loss function. To minimize the loss, the gradients of the model parameters are computed during backward propagation. Finally, model parameters are updated using the gradients. This process is repeated over several timesteps, called epochs, until a required accuracy is achieved.

DNN parallelization strategies can be broadly classified into three categories, namely, data parallelism, model parallelism, and pipeline parallelism. One strategy that combines these approaches to parallelize each layer differently is often referred to as hybrid parallelism. As described below, each parallelization strategy has its own advantages and disadvantages.

In data parallelism, each of p devices keeps a replica of the entire DNN, and each mini-batch is split into p shards and is distributed to different devices. Each device performs forward and backward propagation independently on its shard of data. During the update phase, gradients from all the devices are accumulated, typically through an all-reduce operation, before local copies of model parameters are updated. On a model with a large number of model parameters, this becomes a major bottleneck. Further, as the model parameters are replicated (instead of being split and distributed), it might be impossible to train large models by just using data parallelism, due to memory constraints. In addition, data parallelism is inefficient at small mini-batch sizes. Unfortunately, using a larger mini-batch size may not always be possible due to poor convergence and poor accuracy. Despite these drawbacks, data parallelism remains popular due to its simplicity and the ability to apply data parallelism on an entire network automatically. Data parallelism can also be viewed as dividing the work along the mini-batch dimension.

An alternative strategy divides the work along model dimensions (e.g., channel dimension, filter dimension, etc.). This is the approach taken in model parallelism, in which model parameters are distributed among different devices and each device calculates only a part of a layer's activations (and gradients) during forward (and backward) propagation. This conserves memory, but it incurs additional communication (typically an all-to-all communication) to accumulate the activations (and gradients) during forward (and backward) propagation. Depending on the mini-batch and model parameter sizes, one parallelization strategy may be more efficient than the other.

A third approach, pipeline parallelism, involves placing different layers of a network on different devices without splitting the input data and model parameters along any dimension. This allows the computation of layers that do not have data dependencies to overlap. Each device computes the activations (and gradients) for the layers it owns, and sends the results to the devices that own successive layers. This strategy has the advantage of not needing to collectively communicate the model parameters; however, it requires sufficient interlayer parallelism, and the data needs to arrive at a specific rate through the pipeline for this strategy to be efficient.

A hybrid parallelism combines some or all of the three strategies to parallelize different layers differently by using a combination of strategies (e.g., data+model parallelism). As detailed in Section B below, there are several possibilities to choose how different layers should be parallelized. Hence, it is impractical to exhaustively search for an optimal strategy for hybrid parallelism. Based on domain specific knowledge, expert-designed strategies have been proposed on a case-by-case basis for different DNNs. There also have been efforts to automatically find good strategies. These approaches either (i) apply different heuristics to find a greedy solution, or (ii) find an optimal solution restricted to a certain class of DNNs (e.g., convolution networks), or (iii) reduce the search space by restricting some choices to find an optimal strategy within the reduced search space.

In this patent document, hybrid parallelism strategies are used. In one or more embodiments, interlayer pipeline parallelism may be ignored, and a combination of model and data parallelism may be used to find the best strategy for parallelizing different layers of a DNN. Various embodiments comprise a formulation and a node (or vertex) ordering technique to efficiently compute the parallelization strategies corresponding to minimum training costs of DNNs. An efficient process may use the formulation to compute the best strategies for various DNNs.

Experimental results demonstrate that, in one or more embodiments, ignoring interlayer pipeline parallelism does not extensively prune the optimal strategies from the search space. Strategies suggested by a novel process are evaluated against a baseline data-parallel strategy, expert-designed strategies, and strategies proposed by a state-of-the-art approach, Framework1, discussed in Experimental Results section D below. Results show that, in most cases, the process finds efficient strategies for various DNNs within a few seconds. The presented strategies outperform data parallelism by up to 1.85 times on a multi-node/multi-GPU system consisting of 1080Ti GPUs, and by up to four times on a system consisting of 2080Ti GPUs for various benchmarks. The presented strategies also perform better than the expert-designed strategies and the strategies suggested by Framework1.

B. Problem Representation

A DNN may be represented as a computation graph $G=(V, E)$ that is a weakly connected directed graph, where each node $v \in V$ corresponds to a layer (e.g., a fully-connected layer, a convolution layer, etc.) in the DNN, and each edge $(u, v) \in E$ represents a flow of a tensor that is an output of u and an input of v. Each node $v \in V$ has an associated iteration space that captures the computation of v. Considering, for instance, a fully-connected layer that multiplies a matrix $A_{M \times K}$ with a matrix $B_{K \times N}$. Its iteration space is specified by the set $\{(i, j, k) \in \mathbb{Z}^3 | 0 \leq i < M \wedge 0 \leq j < N \wedge 0 \leq k < K\}$.

A parallelization configuration $C_v$ of a node v is a d-tuple of positive integers that defines how the iteration space of v is split and parallelized across different devices, where d is the dimension of the iteration space of v. FIG. 1 depicts an exemplary iteration space of a GEMM computation that is parallelized using the parallelization configuration (1, 4, 2). For the fully-connected layer example in FIG. 1, the configuration (1, 4, 2) specifies that the j dimension of the iteration space should be split into 4 equal parts along the second dimension of its iteration space, and that the k dimension should be split into 2 parts along the third dimension of its iteration space, while the i dimension is not distributed. Computationally, the configuration specifies to split columns of matrix A 102 and rows of matrix B 104 into two halves; split columns of matrix B 104 into four quarters; perform the 8 GEMM computations that correspond to each part on 8 separate devices; and finally perform partial reduction of the intermediate results. Given a node v with d dimensional iteration space and p devices, a set of valid configurations for v is given by $C(v,p)=\{(c_1, \ldots, c_d) \in \mathbb{Z}_{>0}^d | \Pi_{i=1}^d c_i \leq p\}$.

For notational simplicity, when p is clear from the context, $C(v,p)$ may be specified as $C(v)$. Alternatively, a layer v that is parallelized using a configuration $C_v$ may be viewed as an iteration space tiling of the computation of v.

A parallelization strategy $\phi$ is the set $\{(v, C_v) | v \in V \wedge C_v \in C(v)\}$ that specifies a valid configuration for each node $v \in V$. A configuration for a node v in strategy $\phi$ is given by $C_v = \phi(v)$. A substrategy $\phi_{|U}$ is a strategy $\phi$ restricted to the subset U, i.e., $\phi_{|U} = \{(u, C_u) \in \phi | u \in U\}$. An optimal strategy $\hat{\phi}$ is a parallelization strategy that has the minimum cost over all possible strategies for V, under a given cost function $\mathcal{F}$, i.e., $\hat{\phi} = \arg\min_{\phi \in \Phi} \mathcal{F}(G, \phi)$, where $\Phi$ is the set of all valid strategies for V in which each strategy $\phi \in \Phi$ is a unique combination of valid configurations of V.

In one or more embodiments, given a processing environment with p devices with an average peak floating-point performance of F FLOPS per device, and an average communication bandwidth of B bytes per second per link, the cost function may be expressed as:

$$\mathcal{F}(G, \phi) = \sum_{v \in V} t_l(v, \phi(v), r) + \sum_{(u,v) \in E} r \times t_x(u, v, \phi(u), \phi(v)) \quad (1)$$

where $r=F/B$ is the FLOP-to-bytes ratio; layer cost $t_l$ is the cost (in FLOP) of computing a layer, e.g., a fully-connected layer, and may comprise both computation and communication that may occurs internally within a layer, such as an all-reduce operation that is normalized to FLOP (e.g., by multiplying it with r); and data transfer cost $t_x$ is the communication cost in bytes needed to communicate the tensor that flows along the edge (u, v) or (v, u) during forward and/or backward propagation. It is noted that $t_x$ is edge-direction agnostic, i.e., for an edge $(u, v) \in E$, $t_x(u, v, \phi(u), \phi(v)) = t_x(v, u, \phi(v), \phi(u))$.

In one or more embodiments, cost function $\mathcal{F}$ may be an approximation of the actual cost and may ignore overlapping (or pipelining) of different layers by adding the costs $t_l(v_x, \bullet, \bullet)$ and $t_l(v_y, \bullet, \bullet)$ of any two layers, e.g., instead of taking a max where possible. As previously mentioned, this approach accurately captures data and model parallelism and ignored pipeline parallelism. In one or more embodiments, while pipeline parallelism between layers may be ignored, pipeline parallelism opportunities within a layer may be accurately captured, e.g., by accounting for intralayer pipeline parallelism in the layer cost $t_l$. As discussed in greater detail with reference to Section C, this approximation allows to devise a technique that efficiently and quickly finds the best strategy for DNNs. As experimental results demonstrate, this approach is very effective despite the simplification as most DNNs do not contain significant inherent pipeline parallelism opportunities. In contrast, some existing approaches use pipeline parallelism to improve parallel training throughput by making semantic modifications to the model, including using older weights. However, such semantic modifications lead to variations in model accuracy when compared to the original model. In addition, they may also require more epochs to converge, thus, eliminating any advantages obtained from pipeline parallelism. For comparison, various embodiments herein need not perform any semantic modifications to the model. As a result, the convergence rate and the final accuracy may be exactly the same as for the original model, advantageously, increasing hardware utilization through better parallelism. It is noted that even if various embodiments find the optimal solution $\hat{\phi} = \arg\min_{\phi \in \Phi} \mathcal{F}(G, \phi)$ for $\mathcal{F}$, since the cost function $\mathcal{F}$ itself represents an approximation, rather than referring to the solution as the optimal strategy, a solution may be referred to herein as an efficient strategy or the best strategy to avoid confusion.

In embodiments, $t_l$ and $t_x$ may be computed analytically by using simple closed form expressions in experiments. For an edge (u, v), $t_x$ may be represented by the difference: $\max_d |A(v, d)| + |A(u, d)| - |A(v, d) \cap A(u, d)|$, where $A(v, d)$ and $A(u, d)$ are the volume of input tensor of v needed by a device d. For the few different types of DNN layers, analytically derived expressions may be used to compute layer costs ti. In one or more embodiments, many low-level details, such as cache effects, etc., may be ignored. In addition, using $r=F/B$ to normalize the costs implicitly assumes that the computations achieve close to machine peak performance and the that communication bandwidth is fully utilized. It is noted that such assumptions are not necessary for the presented systems and methods to properly operate, but they may keep the cost computation simple. Further, some embodiments focus on the relative ordering of the costs of various strategies rather than absolute costs to ascertain the best strategy. These simplifying assumptions affect costs of all examined strategies more or less alike, preserving most of the relative ordering. In addition, as most of the DNN computations are composed of dense matrix operations, experiments show that when standard libraries, such as cuBLAS, cuDNN, NCCL, etc., are used for computations, these assumptions are not heavily violated.

C. Computing Efficient Strategies

As mentioned in Section B, each network layer may have a set of valid parallelization configurations. In one or more embodiments, finding an efficient strategy for DNNs comprises choosing the best configuration(s) for each layer.

Notations: Let G=(V, E) be the computation graph of a DNN. For a vertex $v \in V$, N(G,v) denotes its neighbors, i.e., N(G,v)={$u \in V$|(u, v)$\in$E $\vee$ (v,u)$\in$E}. The notation N(v) refers to neighbors of v when G is clear from the context, and N(U)=$\cup_{u \in U}$N(u). For any vertex-set X, its restricted neighbors set R(X,Y)=N(X)$\cap$Y may be defined as a set of neighbors of vertices in X restricted to the set Y. For any vertex-set U and a vertex $u \in U$, its restricted reachable set P (U,u) may be defined as a set of vertices v that are reachable from u using an undirected path $(v_1, \ldots, v_p)$ of length p>1 s.t. $\forall_{i \in [1,p]}, V_i \in U$, i.e., $v \in P(U,u)$ means that a restricted path exists between u and v that goes through only the vertices in U. Let $\mathcal{V}=(v^{(1)}, \ldots, v^{(|V|)})$ be a sequence of vertices in V that is arbitrarily ordered, $\mathcal{V}_{<i}$ and $\mathcal{V}_{\geq i}$ denote sets {$v^{(1)}, \ldots, v^{(i)}$} and {$v^{(i)}, \ldots, v^{(|V|)}$}, respectively. $\mathcal{V}_{<i}$ and $\mathcal{V}_{>i}$ denote the sets {$v^{(1)}, \ldots, v^{(i-1)}$} and {$v^{(i+1)}, \ldots, v^{(|V|)}$}, respectively. For reference, Table I summarizes these notations and other notations defined below.

TABLE I

SUMMARY OF NOTATIONS USED ON A COMPUTATION GRAPH G = (V, E).

| Notation | Description |
| --- | --- |
| $C_v$ | Configuration of a vertex v. |
| $\mathcal{C}$ (v) | All valid configurations of v. |
| $\phi$ | A parallelization strategy for G. |
| $\Phi$ | All valid parallelization strategies for G. |
| $\phi$(v) | Configuration of v in the strategy $\phi$. |
| $\mathcal{V}$ | An ordering of V. |
| $v^{(i)}$ | $i^{th}$ element in $\mathcal{V}$. |
| $\mathcal{V}_{<i}$ | A set of first i − 1 elements in a sequence $\mathcal{V}$. |
| $\mathcal{V}_{>i}$ | All, except the first i elements in a sequence $\mathcal{V}$. |
| N(v) | Neighbors of v. |
| R(X, Y) | Restricted neighbors N(X) $\cap$ Y. |
| P(U, u) | Restricted reachable set, where v $\in$ P(U, u) $\Rightarrow$ there is a restricted path between u and v passing only through U. |
| L($\mathcal{V}$, i) | Left-reachable set of $v^{(i)}$: P($\mathcal{V}_{<i}, v^{(i)}$) − {$v^{(i)}$}. |
| T($\mathcal{V}$, i) | Terminal set of $v^{(i)}$: L($\mathcal{V}$, i) − $\cup_{j<i}$ L($\mathcal{V}$, j). |
| D($\mathcal{V}$, i) | Right-dependent set of $v^{(i)}$: {v $\in$ $\mathcal{V}_{>i}$ | v $\in$ P($\mathcal{V}_{\leq i} \cup$ {v}, $v^{(i)}$)}. |

1. Observation I and a Naïve Approach

A brute-force method to compute an efficient strategy for G=(V,E) is to enumerate all possible combinations of configurations of the vertices and choose the one with the least cost. The combinatorial nature of this method makes it impractical to use it even on small graphs such as DNN1, discussed in Experimental Results section D below. However, the complexity of the problem can be greatly reduced due to the following observation in Equation (1): changing the configuration for a vertex v from $C_i$ to $C_j$ affects only the layer cost $t_l(v, \bullet, \bullet)$ of the vertex itself and its data transfer costs with its neighbors $t_x(u, v, \bullet, \bullet)$, where $u \in N$ (v). This allows ordering the vertices V into a sequence $\mathcal{V} = (v^{(1)}, \ldots, v^{(|V|)})$ in the order in which the vertices are visited during a breadth-first traversal of G, and computing the best strategy for G using the recurrence (2) below. Let $\phi_i$ be a substrategy for the set of vertices in R ($\mathcal{V}_{\leq i}, \mathcal{V}_{>i}$), where the restricted neighbor set R($\mathcal{V}_{\leq i}, \mathcal{V}_{>i}$) is a set of vertices in $\mathcal{V}_{>i}$ with at least a neighbor in $\mathcal{V}_{\leq i}$, then, for i$\in$[1,|V|], $$\mathcal{B}(V, i, \phi_i) = \min_{(C_i \in C(v^{(i)}))} \mathcal{G}((\mathcal{V}, i, \phi_i \cup \{(v^{(i)}, C_i)\}) + \qquad (2)$$

$$\mathcal{B}(\mathcal{V}, i-1, \phi_i \cup \{(v^{(i)}, C_i)\})$$

$$\mathcal{B}(V, 0, \phi_0) = 0$$

where, $$\mathcal{G}(\mathcal{V}, i, \phi_i) = \qquad (3)$$

$$t_l(v^{(i)}, \phi_i(v^{(i)}), r) + \sum_{v^{(j)} \in R(\{v^{(i)}\}, v_{>i})} r \times t_x(v^{(i)}, v^{(j)}, \phi_i(v^{(i)}), \phi_i(v^{(j)}))$$

The cost of an efficient parallelization strategy for G is given by $\mathcal{B}$ ($\mathcal{V}$,|V|,$\emptyset$). As shown in Table III in Section D, computing efficient strategies using this recurrence is still quite expensive, and it takes a significant amount of time to find the best strategies for graphs other than simple path graphs such as DNN1. A more efficient approach to find the best strategies according to various embodiments is discussed next.

2. Observation II and an Efficient Approach

From the recurrence (2), it can be observed that since $\mathcal{B}$ is a function of the substrategy $\phi_i$ that comprises configurations of R($\mathcal{V}_{\leq i}, \mathcal{V}_{>i}$), a process that computes efficient strategies using (2) should compute $\mathcal{B}$ for all possible combinations of $\phi_i \in \Phi'$, where $\Phi'$is a set of all possible substrategies for R($\mathcal{V}_{\leq i}, \mathcal{V}_{>i}$). Hence, the computational complexity for finding an efficient strategy using (2) is at least O($K^{M+1}$), where K=$\max_{v \in V} |\mathcal{C}$ (v)|. is the maximum number of configurations for any vertex in G, and M=|R( $\mathcal{V}_{\leq i}, \mathcal{V}_{>i}$)|.

Various embodiment order nodes into a sequence $\mathcal{V}$ such that the size of the restricted neighbor sets R($\mathcal{V}_{\leq i}, \mathcal{V}_{>i}$) for any $v^{(i)}$ in $\mathcal{V}$ is as small as possible. In one or more embodiments, this may be accomplished by using a process that orders vertices V in a manner such that the sizes of the restricted neighbor sets are kept to a minimum.

Definitions: Given a graph G=(V, E) and a sequence $\mathcal{V}=(v^{(1)}, \ldots, v^{(|V|)})$, in one or more embodiments, a left-reachable set L($\mathcal{V}$, i)=P($\mathcal{V}_{\leq i}, v^{(i)}$)−{$v^{(i)}$} may be defined as a set of nodes in $\mathcal{V}_{<i}$ that are reachable from $v^{(i)}$ through, e.g., an undirected path $(v^{(a)}, \ldots, v^{(p)})$ of length p>1 s.t. $\forall_{x \in [a,p]}$, 1$\leq$x$\leq$i. In one or more embodiments, a terminal set T($\mathcal{V}$, i)=$v^{(i)} \in$ L($\mathcal{V}$,i))|$\exists_{k<i}$, $v^{(j)} \in$ L($\mathcal{V}$,k)} of $v^{(i)}$ is a set of vertices that are left-reachable from $v^{(i)}$, and are not left-reachable from any other vertex $v^{(k)}$ for k<i. Alternatively, a terminal set may be defined as T($\mathcal{V}$,i)=L($\mathcal{V}$, i)−$\mathring{A}_{j<i}$L($\mathcal{V}$,j). In one or more embodiments, a right-dependent set D($\mathcal{V}$,i)=R(L($\mathcal{V}$,i)$\mathring{A}${$v^{(i)}$}, $\mathcal{V}_{<i}$)={v$\in$ $\mathcal{V}_{>i}$|v$\in$ P( $\mathcal{V}_{\leq i}$, $\mathring{A}$ {v},$v^{(i)}$} may be defined as a subset of $\mathcal{V}_{>i}$ comprising restricted neighbors of itself and its left-reachable set. In one or more embodiments, a right-dependent set $D(\mathcal{V},i)$ may be the equivalent of $R(\mathcal{V}_{\leq i}, \mathcal{V}_{>i})$ in recurrence (2), for the recurrence (4) defined below.

In one or more embodiments, to compute the sequence $\mathcal{V}$, the recurrence in (2) may be reformulated as follows: For any $i \in [1, |V|]$, $$\mathcal{R}(\mathcal{V}, i, \phi_i) = \min_{C_i \in C(v^{(i)})} \mathcal{G}(V, i, \phi_i \cup \{(v^{(i)}, C_i)\}) + \sum_{v^{(j)} \in T(V,i)} R(V, j, \phi_i \cup \{(v^{(i)} 1 C_i)\}) \quad (4)$$

where, $\mathcal{G}$ is defined in (3), and $\phi_i$ is a substrategy for the set of nodes in $D(\mathcal{V},i)$.

Figure 2A:
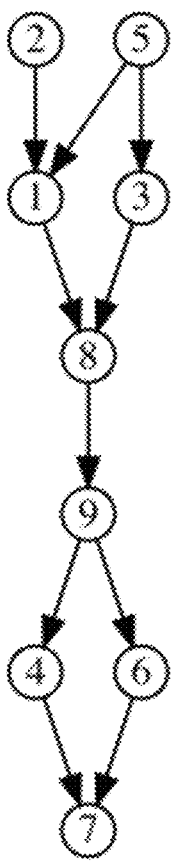
FIG. 2A depicts a simplified exemplary computation graph, according to embodiments of the present disclosure.
Figure 2B:
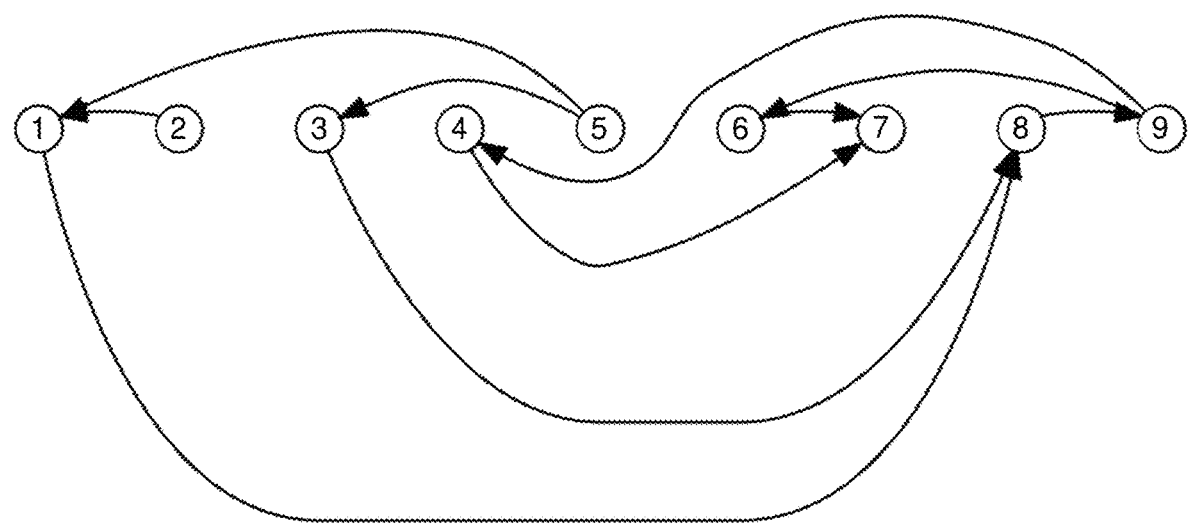
FIG. 2B depicts an exemplary ordering of vertices of the computation graph in FIG. 2A, according to embodiments of the present disclosure.

FIG. 2A depicts a simplified exemplary computation graph 200 according to embodiments of the present disclosure. FIG. 2B depicts an exemplary ordering 250 of vertices of the computation graph in FIG. 2A according to embodiments of the present disclosure. The vertices in FIG. 2B are numbered in the order in which they appear in the sequence. The left-reachable, terminal, and right-dependent sets of $v^{(5)}$ in FIG. 2B are given by $\{v^{(1)}, v^{(2)}, v^{(3)}\}$, $\{v^{(2)}, v^{(3)}\}$, and $\{v^{(8)}\}$, respectively. FIG. 2B also illustrates the advantages of defining the recurrence (4) in terms of terminal sets $T(\mathcal{V},i)$, instead of in terms of the previous node in the sequence $v^{(i-1)}$ as in recurrence (2): In the example in FIG. 2B, $|R(\mathcal{V}_{\leq 5}, \mathcal{V}_{>5})|=|\{v^{(7)}, v^{(8)}, v^{(9)}\}|=3$, while $|D(\mathcal{V},5)|=1$. Thus, a simple recurrence $R(\mathcal{V},i,\phi_i)$, that directly recurses to $R(\mathcal{V},i-1,\phi_i)$ has $|\phi_i|$ more than twice the size of $|D(\mathcal{V},5)|$, even on a simplified graph. Since $|\Phi'|=O(K^{|\phi^i|})$, this exponentially increases the computational complexity of computing the recurrence. Experiments show that this has a significant impact on the running time of the process (detailed later in this section) that computes efficient parallelization strategies. Formulating the recurrence in terms of the terminal sets allows for finding efficient orderings of the vertices that enable finding the best strategies significantly faster. As Theorem 1 below shows, the cost computed by the recurrence (4) is valid and corresponds to a strategy that minimizes the cost function in Equation (1).

Lemma 1: Given a computation graph $G=(V,E)$ and a sequence $\mathcal{V}$, for any vertex $v^{(i)} \in V$ and a substrategy $\phi_i$ comprising configurations for the vertices in $D(\mathcal{V},i)$, $$\mathcal{R}(\mathcal{V}, i, \phi_i) = \min_{\phi' \in \Phi'} \sum_{v^{(j)} \in \{v^{(i)}\} \cup L(\mathcal{V},i)} \mathcal{G}(\mathcal{V}, j; \phi_i \cup \phi')$$

where, $\Phi'$ is the set of all valid substrategies for $\{v^{(i)}\} \cup L(\mathcal{V},i)$.

Proof: It will be shown that $\mathcal{R}(\mathcal{V},i,\cdot)$ recursively calls $\mathcal{R}(\mathcal{V},j,\cdot)$: (i) at most once, (ii) at least once, and (iii) only if $v^{(j)} \in L(\mathcal{V},i)$.

From the definition of a terminal set, for any x,y s.t. $1 \leq x < y \leq |V|$, $T(\mathcal{V},x) \cap T(\mathcal{V},y) = \emptyset$, since as a contradiction if $v^{(j)} \in T(\mathcal{V},x) \cap T(\mathcal{V},y)$, then $v^{(jj)} \in L(\mathcal{V},x) \wedge v^{(j)} \in L(\mathcal{V},y) \Rightarrow v^{(x)} \in L(\mathcal{V},y) \Rightarrow v^{(j)} \notin T(\mathcal{V},y)$, violating the assumption. This proves (i).

In order to prove (ii), as a contradiction, assume that $\mathcal{R}(\mathcal{V},j,.)$ is never called from $\mathcal{R}(\mathcal{V},i,.)$ for a $v^{(jj)} \in L(\mathcal{V},i)$. Without loss of generality, let $v^{(j)}$ be such a vertex closest to $v^{(i)}$, i.e., for any other $k \in [j+1 i-1]$, either $v^{(k)} \notin L(\mathcal{V},i)$ or $\mathcal{R}$ ($\mathcal{V},k,\cdot$) is recursively called from $\mathcal{R}(\mathcal{V},k,\cdot)$. Let $\cup = \{v^{(x)} | v^{(j)} \in L(V,x)\}$ be a set of vertices from which $v^{(j)}$ is left-reachable. Let $v^{(k)} \in \cup$ be the vertex in $\cup$ closest to $v^{(j)}$, i.e., $\exists_{x < k}, v^{(x)} \in \cup$. Then, from the definition of a terminal set, $v^{(j)} \in T(\mathcal{V},k)$, and since $\mathcal{R}(\mathcal{V},k,\cdot)$ is recursively called from $\mathcal{R}(\mathcal{V},i,\cdot)$ according to the assumption made, $\mathcal{R}(\mathcal{V},j,\cdot)$ is also called from $\mathcal{R}(\mathcal{V},i,\cdot)$, contradicting the assumption.

It could be seen that (iii) is always true since, if $v^{(j)} \notin L(\mathcal{V},i)$, then $v^{(j)} \notin L(\mathcal{V},k)$ for any $v^{(k)} \in L(\mathcal{V},i)$. Hence, $v^{(j)} \notin T(V,k)$ for any $v^{(k)} \in \{v^{(i)}\} \cup L(\mathcal{V},i)$.

The following Theorem follows from Lemma 1.

Theorem 1: Let $G=(V,E)$ be a computation graph for a DNN that is executed in a processing environment with p devices with average FLOP-to-bytes ratio r. Let V be a sequence for V, and $\Phi$ be all possible strategies for G, then $$\mathcal{R}(\mathcal{V}, |V|, \Phi) = \min_{\phi \in \Phi} \mathcal{F}(G, \phi)$$

Proof: Since a computation graph is a weakly connected graph, $L(\mathcal{V},|V|) \cup \{v^{|V|}\} = V$, following Lemma 1, $$\mathcal{R}(\mathcal{V}; |V|, \Phi) = \min_{(\phi \in \Phi)} \sum_{v^{(i)} \in V} \mathcal{G}(V, i, \phi) = \min_{\phi \in \Phi} \quad (5)$$

$$\sum_{v^{(i)} \in V} \left[ t_l(v^{(i)}, \phi(v^{(i)}), r) + \sum_{v^{(j)} \in R(\{v^{(i)}\}, v_{>i})} r \times t_x(v^{(i)}, v^{(j)}, \phi(v^{(i)}), \phi(v^{(j)})) \right] =$$

$$\min_{\phi \in \Phi} \sum_{v^{(i)} \in V} [t_l(v^{(i)}, \phi(v^{(i)}), r] + \sum_{(v^{(i)}, v^{(j)}) \in E} [r \times t_x(v^{(i)}, v^{(j)}, \phi(v^{(i)}), \phi(v^{(j)}))] =$$

$$\min_{\phi \in \Phi} \mathcal{F}(G, \phi)$$

Equation (5) is due to the fact that $\cup_{v^{(i)} \in V} \{\{v^{(i)}, v^{(j)}\} | v^{(j)} \in R(\{v^{(i)}\}, \mathcal{V}_{>i})\} = E'$, and for any x,y, $x \neq y \Rightarrow \{\{v^{(x)}, v^{(j)}\} | v^{(j)} \in r(\{v^{(x)}\}, \cap \{\{v^{(y)}, v^{(j)}\} | v^{(j)} \in R(\{v^{(y)}\}, v_{>y})\} = \emptyset$, where $E' = \{\{u,v\} | (u,v) \in E\}$ is the undirected equivalent of E.

FIG. 3A depicts an exemplary procedure for ordering vertices into an efficient sequence according to embodiments of the present disclosure. In one or more embodiments, procedure 300 (labeled GENERATESEQ in FIG. 3A) may generate a sequence that maintains the sizes of right-dependent sets D(V,i) (referred to as v.d in FIG. 3A) as small as possible. Procedure 300 may also concurrently build the terminal sets (referred to as v.t in FIG. 3A) for the vertices of G that are used in FIG. 4 below.

In Line 1, procedure 300 in FIG. 3A may initialize the right-dependent set v.d for each node $v \in V$ to its neighbors. In Line 7, a node u that has the least cardinality |u.d| may be picked from the set of nodes U that are yet to be sequenced. This node becomes $v^{(i)}$ in V. Once u has been added to V, for all the nodes in $v^{(i)}$.d, v.d may be updated, e.g., to ensure that |v.d| in Line 7 is correctly maintained. In Line 11, the terminal set for the nodes may be updated. Theorem 2 below shows that the dependent and terminal sets computed by procedure 300 are correct. Computational complexity of procedure 300 is $O(|V|^2)$.

Figure 3B:
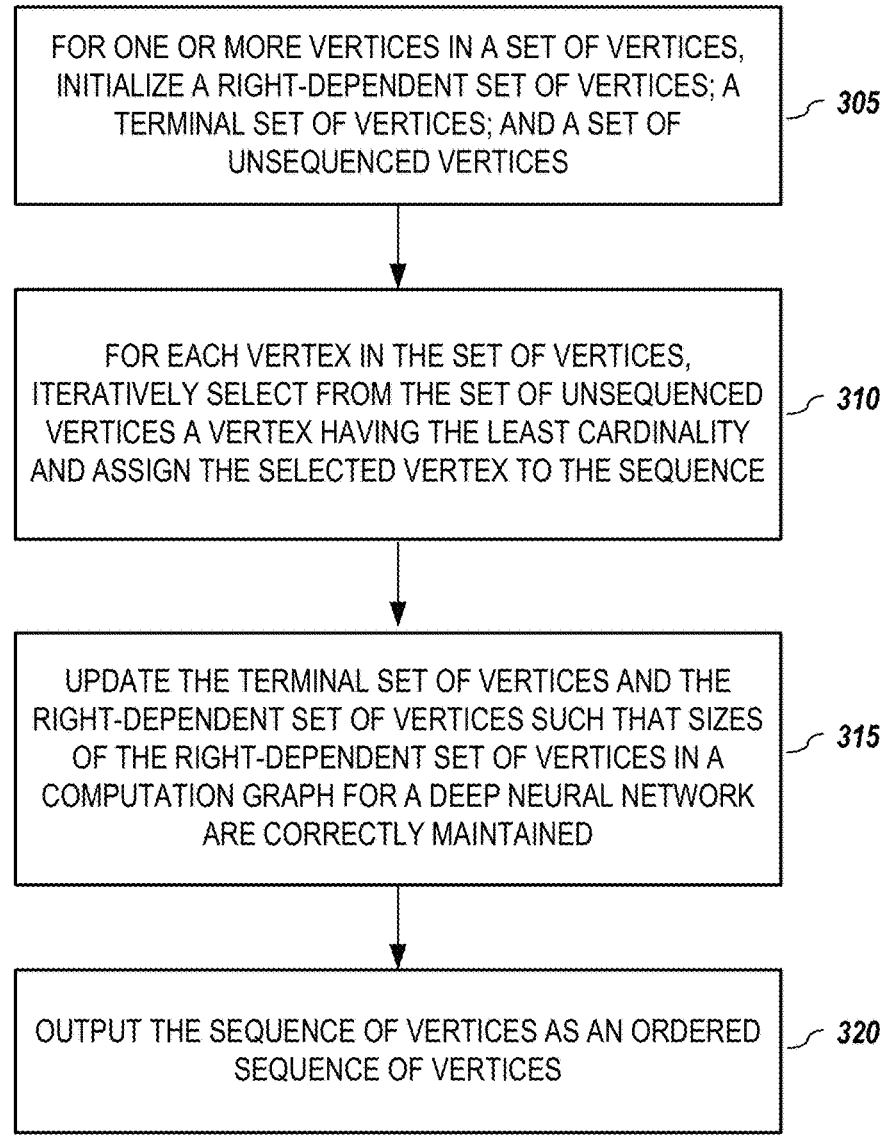
FIG. 3B depicts a flowchart illustrating a process for ordering vertices for a computation graph for a DNN to generate an efficient sequence of vertices to increase hardware utilization and reduce training times of the DNN, according to embodiments of the present disclosure.

FIG. 3B depicts a flowchart illustrating a process for ordering vertices for a computation graph for a DNN to generate an efficient sequence of vertices to increase hardware utilization and reduce training times of the DNN, according to embodiments of the present disclosure. In one or more embodiments, process 301 for ordering vertices for a computation graph may begin when for one or more vertices in a set of vertices, a right-dependent set of vertices, a terminal set of vertices, and a set of unsequenced vertices are initialized (305). In one or more embodiments, for each vertex in the set of vertices, a vertex having the least right-dependent set cardinality may be iteratively selected (310) from the set of unsequenced vertices, and the selected vertex may be assigned to the sequence. In one or more embodiments, the terminal set of vertices and the right-dependent set of vertices may be updated (315) in a manner such that sizes of the right-dependent set of vertices in a computation graph for the DNN are maintained. Finally, the sequence of vertices may be output (320) as an ordered sequence of vertices.

FIG. 4A depicts a dynamic programming (DP) based process for computing an efficient strategy for a computation graph according to embodiments of the present disclosure. In one or more embodiments, DP process 400 (labeled GETBESTSTRATEGY) may use the ordering procedure in FIG. 3A and recurrence (4).

In one or more embodiments, as shown in Line 1 of DP process 400, the nodes in computation graph G may be first sorted using the GENERATESEQ procedure. In Line 6, all possible valid substrategies $\Phi'$ for the set $D(\mathcal{V},i)$ may be computed. Then, for each $\phi' \in \Phi'$, a configuration $C \in \mathcal{C}(v^{(i)})$ that minimizes the cost $\mathcal{R}(\mathcal{V}, i, \phi')$ may be computed as shown in Lines 11-22: Line 13 computes $\mathcal{G}(\mathcal{V}, i, \phi')$; Lines 14-16 compute $\Sigma_{v^{(j)} \in T(\mathcal{V},i)} \mathcal{R}(\mathcal{V}, j, \phi'')$ using the costs stored in the DP tables $v^{(i)}$.tbl; and, the configuration that leads to the minimum cost may be stored into $\phi$ in Line 19. In one or more embodiments, the DP table for $v^{(i)}$ may be updated with $\phi$ and its cost min_cost, as shown in Line 22. From the definition of terminal nodes, it can be seen that $v^{(j)} \in T(\mathcal{V},i) \Rightarrow D(\mathcal{V},j) \subseteq \{v^{(i)}\} \cup D(\mathcal{V},i)$. Hence, in Line 15, the table $v^{(j)}$.tbl comprises one entry for the substrategy $\phi_{|v^{(j)},d}''$ and its corresponding cost $\mathcal{R}(\mathcal{V}, j, \phi'')$. Similarly, in Line 26 in FIG. 4A, $v^{(|\mathcal{V}|)}$.tbl comprises one entry that comprises an efficient strategy for G and its cost. The overall computational complexity of FIG. 4A is $O(|V|^2 K^{M+1})$, where $K=\max_{v \in V}|\mathcal{C}(v)|$ is the maximum number of configurations for a layer, and $M=\max_{v^{(i)} \in V}|D(\mathcal{V},i)|$ is the maximum size of the right-dependent set. The proof by induction below demonstrates that the right-dependent sets and terminal sets constructed by using the GENERATESEQ procedure in FIG. 3A are indeed correct follows:

Theorem 2:

Given a computation graph G=(V,E), and a sequence V that is computed by using the GENERATESEQ procedure in FIG. 3A, for any node $v^{(i)} \in V$, (i) $v^{(i)}.d = D(\mathcal{V},i)$, and (ii) $v^{(i)}.t = T(\mathcal{V},i)$.

Proof:

At the end of any iteration i, there is a partial sequence $\mathcal{V}_{\leq i}$ and the remaining nodes $U = V - \mathcal{V}_{\leq i}$ that are yet to be sequenced. As will be shown, the following invariants hold at the end of any iteration i: For any $u \in U$, $$u \bullet d = \{v \in U - \{u\} \mid v \in P(V_{\leq i} \cup \{u, v\}, u)\} \quad (6)$$

$$u \bullet t = P(V_{\leq i} \cup \{u\}, u) - \{u\} - \bigcup_{j \leq i} L(V, j) \quad (7)$$

and, for any $v^{(j)} \in \mathcal{V}_{\leq i}$, $v^{(j)}.d = D(\mathcal{V},j)$ and $v^{(j)}.t = T(\mathcal{V},j)$.

Induction Base:

The invariants trivially hold at the beginning of the first iteration (i=0) as v.d is initialized to N(v), and v.t is initialized to Ø for any $v \in V$.

Induction Step:

As a hypothesis, the invariants are true at the end of an iteration i. Let $v^{(i+1)}$ be the node picked at Line 7 by GENERATESEQ during the iteration i+1, and let U be the unprocessed node set at the beginning of iteration i+1 (with $v^{(i+1)} \in U$). For any vertex $u \notin v^{(i+1)}.d$, since there exists no restricted path between u and $v^{(i+1)}$, $P(\mathcal{V}_{\leq i} \cup \{u\}, u) = P(\mathcal{V}_{\leq i+1} \cup \{u\}, u)$. Hence, invariants (6) and (7) are trivially satisfied. For any $u \in v^{(i+1)}.d$, $$u \bullet d \cup v^{(i+1)} \bullet d - \{v^{(i+1)}, u\} = \{v \in U - \{u\} \mid v \in P(V_{\leq i} \cup \{u, v\}, u)\} \cup$$
$$\{v \in U - \{v^{(i+1)}\} \mid v \in P(V_{\leq i} \cup \{v^{(i+1)}, v\}.v^{(i+1)})\} - \{v^{(i+1)}, u\} =$$
$$\{v \in U - \{v^{(i+1)}, u\} \mid v \in P(V_{\leq i+1} \cup \{u, v\}, u)\}$$

Thus, invariant (6) is satisfied due to the assignments to u.d at Line 10 in GENERATESEQ. Also, $v^{(i+1)}.d = \{v \in U - \{v^{(i+1)}\} \mid v \in P(\mathcal{V}_{\leq i} \cup \{v^{(i+1)}, v\}, v^{(i+1)})\} = D(\mathcal{V}, i+1)$. Further, since $v^{(i+1)} \notin u.d$ for any $u \in U$, $v^{(i+1)}.d$ is never modified after iteration i+1. Now, $$u \bullet t - v^{(i+1)} \bullet t \cup \{v^{(i+1)}\} =$$
$$P(V_{\leq i} \cup \{u\}, u) - \{u\} - \bigcup_{j \leq i} L(V, j) - P(V_{\leq i} \cup \{v^{(i+1)}\}, v^{(i+1)}) \cup \{v^{(i+1)}\} =$$
$$P(V_{\leq i+1} \cup \{u\}, u) - \{u\} - \bigcup_{j \leq i+1} L(V, j)$$

Thus, the invariant (7) is satisfied due to the assignments to u.t at Line 11 in GENERATESEQ. Also, $v^{(i+1)}.t = P(\mathcal{V}_{\leq i} \cup \{v^{(i+1)}\}, v^{(i+1)}) - \{v^{(i+1)}\} - \bigcup_{j \leq i} L(\mathcal{V}, j) = T(\mathcal{V}, i+1)$. Further, since $v^{(i+1)} \notin u.d$ for any $u \in U$, $v^{(i+1)}.t$ is never modified after iteration i+1.

FIG. 4B depicts a flowchart illustrating a process for finding an efficient strategy for parallelizing vertices of a DNN to increase hardware utilization and reduce training time, according to embodiments of the present disclosure. In one or more embodiments, process 401 for finding an efficient parallelizing strategy may begin by obtaining (405) a sequence of vertices for a DNN. The sequence of vertices may be ordered according to a node (or vertex) ordering strategy such that sizes of restricted neighbor sets in a computation graph that represents the DNN are reduced. In one or more embodiments, for each vertex in the sequence of vertices, a recurrence may be used to compute (410) substrategies for parallelizing layers of the DNN. Each layer may be associated with one or more valid configurations that reduce a configuration cost according to a cost function. Finally, the strategy that has the lowest configuration cost for the computation graph may be output (415).

3. Example: DNN2

Figure 5:
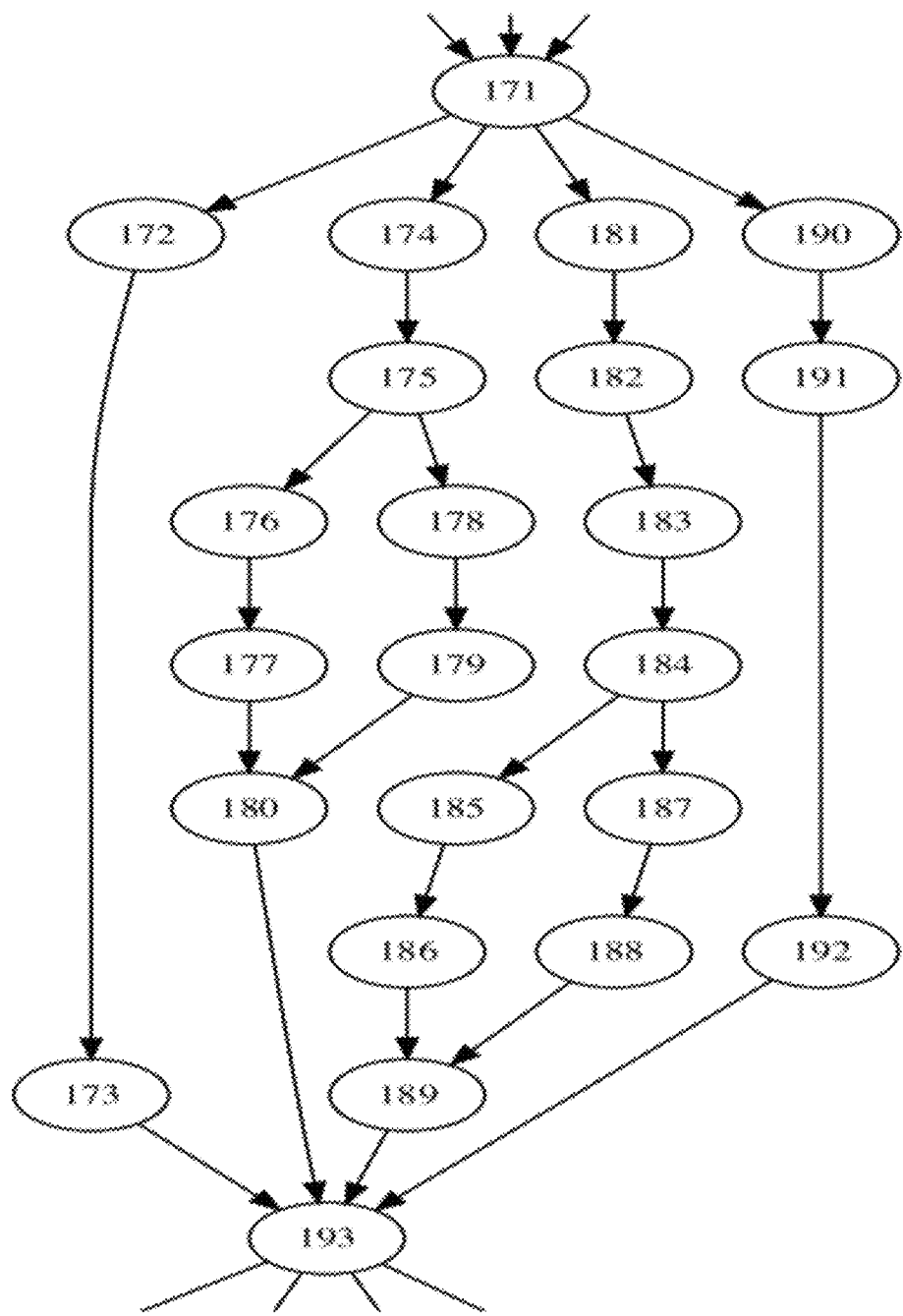
FIG. 5 depicts a computation subgraph, according to embodiments of the present disclosure.

FIG. 5 depicts a computation subgraph according to embodiments of the present disclosure. Computation subgraph 500 corresponds to an inception module of DNN2 network. A similar structure repeats throughout the graph. Nodes 171 and 193 in FIG. 5 have a high degree, while the rest of the nodes in the subgraph are sparse.

Since the computation graphs of DNNs are generally sparse and have few high-degree nodes, in one or more embodiments, the sequence generated by GENERATESEQ is very effective on the computation graphs of DNNs, as actual running times (shown in Table III below) demonstrate. For instance, of the 218 nodes in the computation graph of the DNN2 module, 206 nodes have a degree of <5 and the remaining 12 nodes have a degree ≥5. When the nodes are sequenced in the original order (in which the computation graph was built) or using a breadth first traversal, the procedure to find the best strategy runs for several hours before the memory is exhausted (as the DP table correspondingly grows significantly) before completion.

In contrast, in one or more embodiments, when nodes are sequenced using GENERATESEQ, an efficient strategy may be found in 20 seconds or less (for p=8 GPUs). This is mainly because GENERATESEQ ensures that high-degree nodes (nodes 171 and 193 in FIG. 5) are placed in the sequence after their (low-degree) neighbors and their ancestors/descendants are placed in the sequence, thus, ensuring that the size of right-dependent set of these high-degree nodes remains small.

Experimental data shows that the number of configurations per vertex of DNN2 vary between 10-30 for p=8 GPUs, and the maximum number of configurations reaches up to 100 (i.e., K=100) for p=64 GPUs. In one or more embodiments, by ordering the vertices using GENERATESEQ, the size $|D(\mathcal{V}, i) \cup \{v^{(i)}\}|$ for any i may be maintained at ≤3, and the maximum number of combinations may be analyzed per vertex by the process, $|\Phi^i| \leq 25200$, for p=8. For comparison, when breadth-first ordering is used, the sizes of right-dependent sets reach up to 11, leading to $|\Phi^i| \geq 11^{10}$, making it prohibitively expensive in practice, in terms of both time and memory.

D. Experimental Results

Hybrid parallelism strategies found by DP process 400 are evaluated on four different benchmarks. The benchmarks are chosen to be representative of the whole DNN space. a) DNN1 is an image classification convolutional network (CNN) whose computation graph is a simple path graph, where each layer is connected only to the next layer; b) DNN2 is a deep CNN that uses inception modules to increase the number of layers while maintaining a reasonable computational budget. The nodes are split and concatenated at the beginning and end of each inception module, respectively, leading to a few high degree nodes in its computation graph; c) DNN3 is a two-layer recurrent neural network consisting of LSTM cells, used for language modeling tasks; and finally, d) DNN4 is a non-recurrent neural machine translation model, whose computation graph is quite different from recurrent networks such as DNN3. Datasets used in experiments are summarized in Table II. A batch size of 128 was used for CNNs, and a batch size of 64 was used for the rest of the benchmarks. Results using embodiments of the present disclosure are compared against data parallelism, expert-designed strategies, and the strategies suggested by Framework1.

TABLE II

DATASETS USED IN EXPERIMENTS FOR DIFFERENT DNNs

| Network | Dataset |
|---|---|
| DNN1 | Dataset1 |
| DNN2 | Dataset1 |
| DNN3 | Dataset2 |
| DNN4 | Dataset3 English-German |

Framework1:

Framework1 is a deep learning framework that automatically finds fast parallelization strategies. It uses a general Markov Chain Monte Carlo (MCMC) search process to explore the search space and iteratively proposes candidate strategies based on the simulated performance of previous candidates. When the search procedure is finished, the framework returns the best strategy it has discovered. As this approach is based on meta-heuristics, the framework could get stuck in a local minimum, returning a sub-optimal strategy. An initial candidate from the search space needs to be provided to MCMC to begin the search process, and the efficiency of the strategy found by Framework1 might also vary depending on the initial candidate. The evaluation of Framework1 herein uses expert-designed strategies as the initial candidates, such that Framework1 can improve upon them.

Expert Strategies:

Expert-designed parallelization strategies were developed by the domain experts to improve a model's parallel performance on a case-by-case basis. Since not all DNNs have well-defined expert-designed strategies proposed, the following ones that were the most relevant for various benchmarks are chosen: For convolution networks, data parallelism is used for convolution layers, and model parallelism is used for fully-connected layers. This technique is referred to as the "one weird trick" (OWT). Even though this technique was especially proposed for DNN1, it is applicable for any convolution network, in general. Thus, we use this technique to evaluate both DNN1 and DNN2, discussed in Experimental Results section D below. For RNNs, a data+pipeline parallelism strategy has been proposed, where different layers of RNN are placed on different devices to achieve pipeline parallelism, and each layer is replicated on the remaining devices for data parallelism. This strategy is compared against DNN3 experiments. For the DNN4 model, also discussed in Experimental Results section D below, a model parallelism strategy that has been suggested is used in experiments as the expert-designed strategy. This strategy was primarily proposed to overcome the memory bottlenecks in order to train a large DNN4 model within the memory constraints of current architectures, while also achieving good parallel execution efficiency.

1. Overhead of Different Approaches to Find Efficient Strategies

In this subsection, the time taken by different approaches is measured to find the best strategies for the four different benchmarks. The running time of an embodiment that uses GENERATESEQ to order the vertices is compared against breadth-first (BF) traversal vertex ordering, and Framework1 that uses meta-heuristics to find efficient strategies. The embodiment herein was implemented in a prototype tool written in Python. The measurements were performed on a machine with Intel Xeon E5 (SandyBridge) processor, and 1080Ti GPUs. Since analytical costs for $t_l$ and $t_x$ are used, the embodiment does not use the GPUs to perform the analysis; however, Framework1 performs actual simulation by executing the operators on the GPU and uses those measurements in its analysis to find the best strategies. Table III below shows the time taken by different approaches to find the best strategies. For measuring the running times, Framework1's search process is halted either when it is unable to improve the best discovered strategy for half the search time, or when it has reached 250,000 iterations.

As the computation graph of DNN1 is a simple path graph, sizes of both $R(\mathcal{V}_{\leq i}, \mathcal{V}_{>i})$ and $D(\mathcal{V}, i)$ are just 1 for different vertices. Hence, both BF and GENERATESEQ ordering are able to efficiently compute the best strategies for DNN1 in similar times. However, for DNN2, BF ordering is unable to find the best strategy without running out of memory due to high node degree of a few vertices, as detailed in Subsection 3 below.

For the DNN3 benchmark, since an RNN operator (with LSTM cells) can be efficiently represented in a single iteration space, the complete RNN operator, including the recurrent steps, is represented as a single vertex in the computation graph. The iteration space of an RNN operator is a five-dimensional space consisting of batch dimension, sentence sequence dimension (recurrent steps are captured by this dimension), layer dimension, hidden dimension, and the output dimension. Note that this is different from the way the RNN operator is handled by Framework1. In Framework1, the recurrent dimension is unrolled (experiments herein use an unroll factor of 40), and each iteration is represented as a vertex in the graph. In one or more embodiments, by representing the whole RNN operator as a single vertex, in addition to significantly reducing the graph size, it also allows to analyze configurations that take advantage of inherent pipeline parallelism present within an RNN operator. Configurations that split the layer and the sentence sequence dimensions capture pipeline parallelism opportunities in an RNN. As detailed in Section B, embodiments that do not capture inter-layer pipeline parallelism are still capable of capturing intra-layer pipeline parallelism by splitting the layer dimension of DNN3's iteration space. With this representation, the computation graph of DNN3 reduces to a simple path graph. Hence, both BF and GENERATESEQ orderings are able to efficiently find the best strategies within, e.g., a second. Since Framework1 dynamically unrolls the recurrent dimension, its process takes longer to analyze the resultant larger graph.

Similar to DNN2, the computation graph of a DNN4 model has a large number of sparse vertices with a very few dense vertices. One major difference is that these high-degree vertices (such as the final output of the encoder) have longer dependencies (i.e., longer live range in the actual computation), as the results of these vertices are used later in the computation. The presence of such long dependencies may eliminate possible vertex orderings that can reduce the sizes of the right-dependent sets as effectively as in the DNN2 model. In one or more embodiments, this may lead to a longer running time to find the best strategy. As with DNN2, BF ordering fails to find the best strategy for DNN4 due to memory constraints. Since the DNN4 model was not implemented and analyzed with Framework1, no comparisons for Framework1's running time for DNN4 are presented here.

2. Comparison of Performances of Different Strategies

Figure 6:
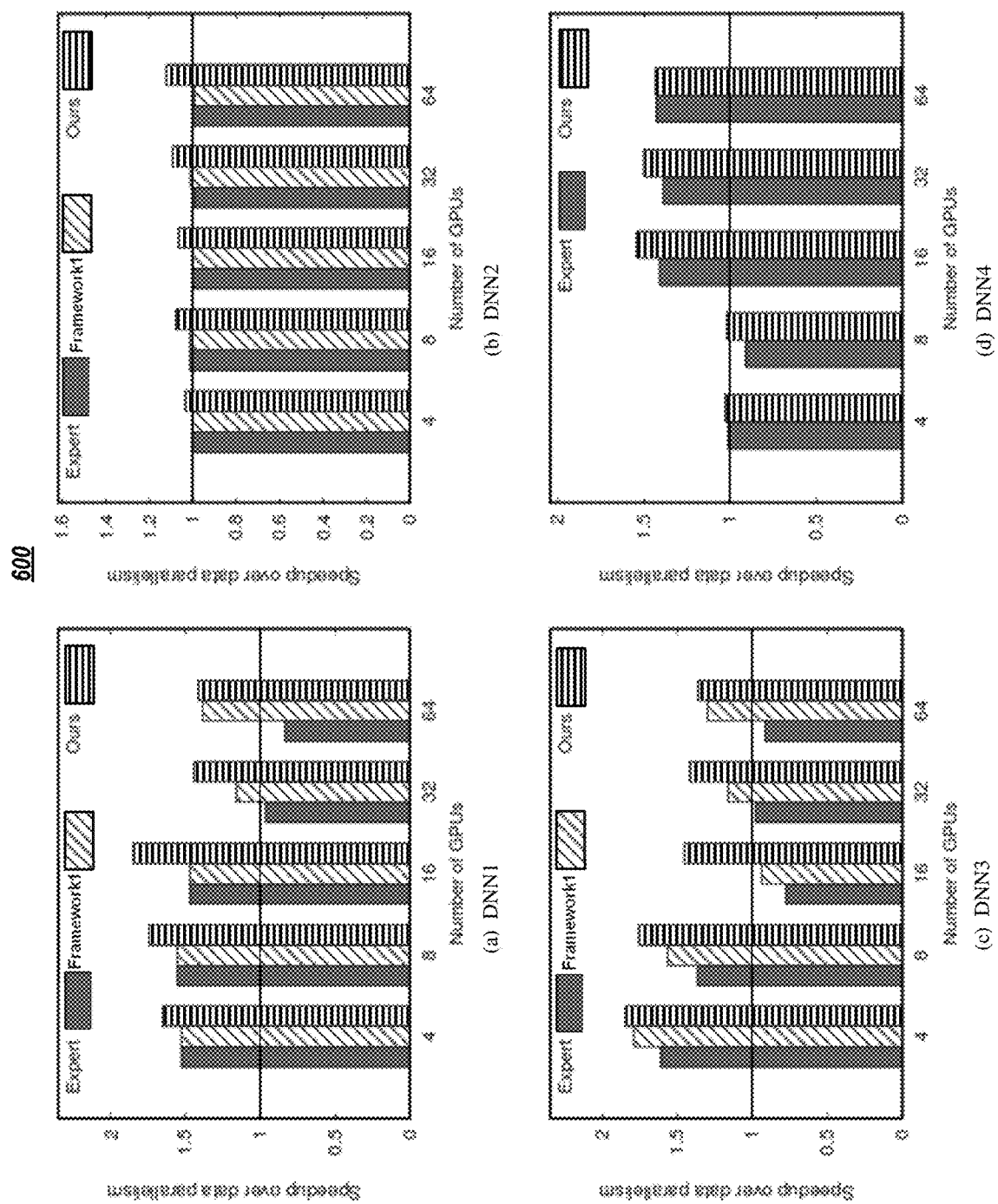
FIG. 6 depicts speedups achieved by strategies suggested by embodiments used in experiments over data-parallelism strategy on 1080Ti systems, according to embodiments of the present disclosure.
Figure 7:
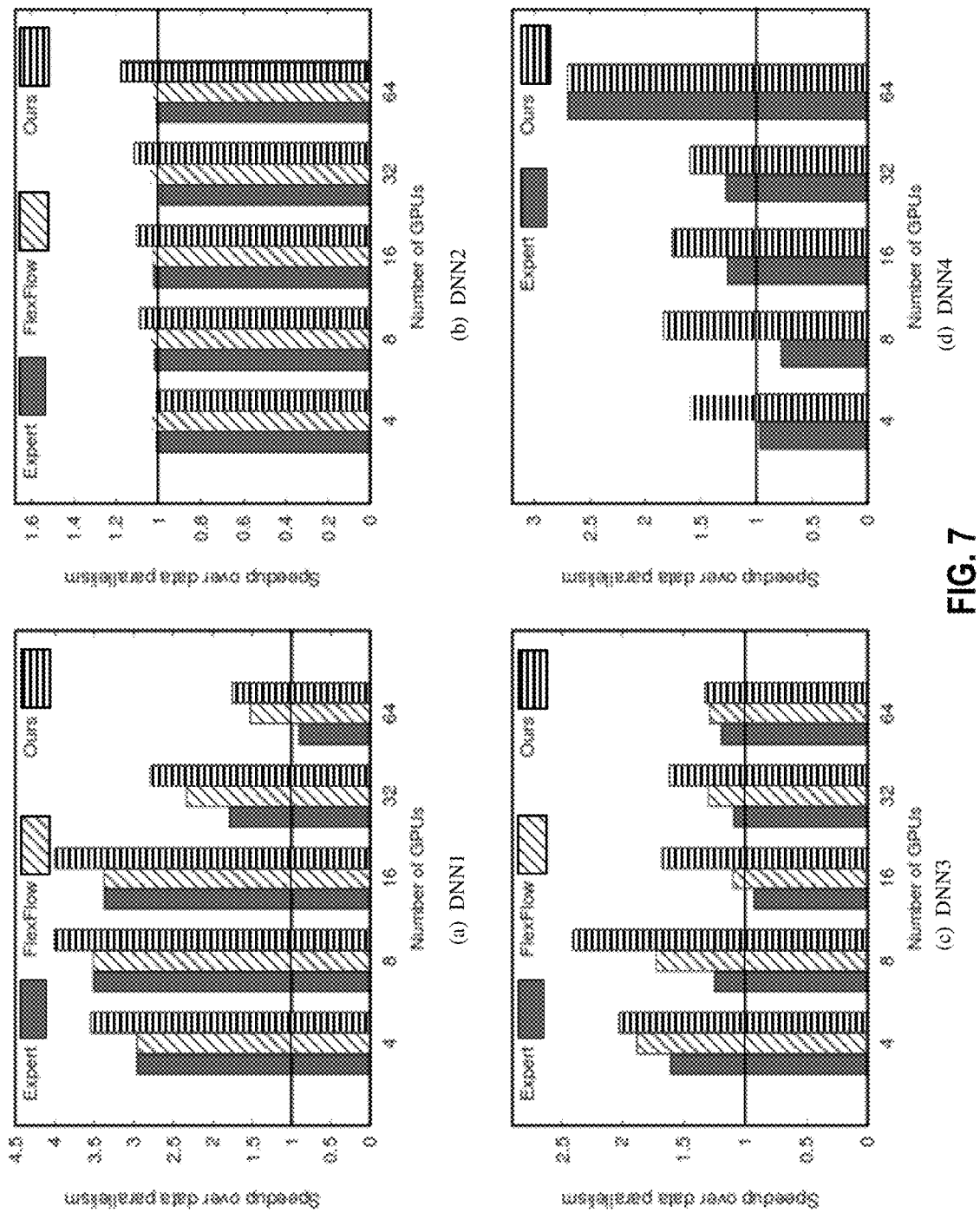
FIG. 7 depicts speedups achieved by strategies suggested by embodiments used in experiments over data-parallelism strategy on 2080Ti systems, according to embodiments of the present disclosure.

Performances of different strategies are compared below. Experiments were performed on different number of GPUs ranging from 4 (on a single node) to 64 (spread over 8 nodes), incremented in powers of 2. The nodes are connected to each other using InfiniBand interconnection network. The results are evaluated on the following two processing environments:

a) a multi-node/multi-GPU system, where each node comprises 8 GeForce GTX 1080 Ti GPUs (with sm_61 compute capabilities) fully-connected using PCIe links; b) a multi-node/multi-GPU system, where each node contains 8 GeForce RTX 2080 Ti GPUs (with sm_75 compute capabilities) fully-connected using PCIe links. The benchmarks and strategies are implemented in the mesh-tensorflow framework for evaluation. Since the DNN4 model was not implemented and evaluated on Framework1, the results from Framework1 for the DNN4 model are not included in the experiments. FIG. 6 and FIG. 7 show the speedups achieved by the strategies suggested by embodiments used in experiments over data-parallelism strategy on 1080Ti and 2080Ti systems, respectively. On 1080Ti machines, the strategies proposed by the embodiments were able to achieve a speedup of up to 1.85× over data parallelism. As shown in FIG. 6, the strategies proposed by embodiments consistently perform better than expert-designed strategies, and the strategies proposed by Framework1. Further, on 2080Ti machines, strategies proposed by embodiments achieve up to 4× speedup over data parallelism, and outperform both expert-designed strategies and the strategies from Framework1. The 2080Ti GPUs do not support peer-to-peer data access when connected over PCIe links, leading to poor hardware communication efficiency, while having a higher computational peak compared to 1080Ti GPUs. This leads to a very low machine balance (ratio between peak communication bandwidth and peak GFLOPS) on 2080Ti nodes. Thus, inefficiencies in parallelization strategies are much more pronounced on 2080Ti nodes than on 1080Ti nodes, as evident from our experiments. This allows embodiments to achieve up to 4× better performance than the data parallelism strategy on 2080Ti nodes.

TABLE III

TIME TAKEN BY DIFFERENT PROCESSES TO FIND EFFICIENT PARALLELIZATION STRATEGIES.
(UNIT: mins:secs.msecs)

| | DNN1 | | | DNN2 | | | DNN3 | | | DNN4 | | |
|---|---|---|---|---|---|---|---|---|---|---|---|---|
| p | BF | Framework1 | Ours | BF | Framework1 | Ours | BF | Framework1 | Ours | BF | Framework1 | Ours |
| 4 | 00:00.2 | 00:02.5 | 00:00.2 | OOM | 01:09.2 | 00:14.4 | 00:00.1 | 01:47.1 | 00:00.1 | OOM | NA | 00:09.8 |
| 8 | 00:00.3 | 00:02.8 | 00:00.3 | OOM | 02:26.5 | 00:20.0 | 00:00.1 | 02:44.3 | 00:00.1 | OOM | NA | 00:28.8 |
| 16 | 00:00.3 | 00:07.0 | 00:00.3 | OOM | 06:05.8 | 00:39.8 | 00:00.1 | 07:12.2 | 00:00.1 | OOM | NA | 02:10.9 |
| 32 | 00:00.4 | 00:07.9 | 00:00.4 | OOM | 15:38.0 | 01:26.0 | 00:00.2 | 11:08.2 | 00:00.1 | OOM | NA | 09:13.0 |
| 64 | 00:00.5 | 04:17.3 | 00:00.5 | OOM | 37:17.0 | 03:16.3 | 00:00.3 | 17:22.0 | 00:00.2 | OOM | NA | 01:23.2 | p: Number of GPUs; BF: Breadth-First ordering; OOM: Out-Of-Memory; NA: Not Available.

3. Analysis of Computed Strategies

DNN1:

DNN1 has five convolution layers, followed by three fully-connected layers. For p=8 GPUs, the DP process GETBESTSTRATEGY, discussed with reference to FIG. 4A, suggests using a data parallelism strategy for the convolution layers. For the first and third fully-connected layers, the process suggests splitting the out-channel dimension by two, and the in-channel dimension by four; and for the second fully-connected layer, it suggests splitting the out-channel dimension by four and the in-channel dimension by two. Advantageously, this alternating pattern eliminates inter-layer communications among the fully-connected layers. This differs from the expert-designed OWT ("one weird trick") strategy, where a simple model parallelism is used for all fully-connected layers, so that the in-channels are not split and the out-channel dimensions are split 8-way, which leads to a disadvantageous all-to-all communication between each fully-connected layer.

DNN2:

An Inception network has a sequence of inception modules (A-E) composed of convolution layers, followed by a single final fully-connected layer. In one or more embodiments, the efficient strategy obtained from GETBESTSTRATEGY suggests using data parallelism for the inception modules A through D, and a hybrid of data+model parallelism for module E. This is because, as the modules go deeper, their output channel dimensions get larger. Hence, the cost function of the DP process finds the communication cost of full data parallelism to be higher. For the final fully-connected layer, the process suggests splitting the out-channel dimension by two, and the in-channel dimension by four, when $p=8$.

DNN3:

An RNNLM network is composed of an embedding layer, followed by two layers of LSTM cells, and a final projection layer, whose computations are dominated by matrix-matrix multiplication. An embedding layer has a relatively large vocabulary dimension V, and a much smaller embedding dimension H. In one or more embodiments, GETBESTSTRATEGY may prefer splitting the vocabulary dimension over the others for the embedding layer.

For the LSTM cells, the DP process suggests to fully split the LSTM layer dimension, and partially to split the other three dimensions—batch, hidden, and output dimensionsto varying degrees depending on the number of GPUs on which it is executed. The final projection layers' output dimension may be same as V and the hidden dimension may be same as H. In one or more embodiments, the process suggests splitting the output dimension completely.

DNN4:

DNN4 model is a non-recurrent attention based NMT model. A known hybrid parallelism strategy splits the batch dimension of all the layers m-way, and splits the model dimensions of different layers—vocabulary dimension, feed-forward hidden layer dimension, and attention heads-n-way. In one or more embodiments, the process suggests using complete model parallelism on a few layers, especially the embedding layers, while using a hybrid of data parallelism and model parallelism of varying degrees for the remaining layers.

E. Related Work

Data parallelism has been widely used as the standard technique to parallelize training DNNs. However, when model parameters are large, data parallelism performs poorly due to high communication requirement. OWT has been suggested to parallelize CNNs, and some have noted that modern CNNs consist of two types of layers with different properties: (i) convolutional layers containing small number of parameters, and (ii) fully-connected layers with large number of parameters. Thus, embodiments contemplate a parallelization strategy that parallelizes these two types of layers differently. As data parallelism is typically best suited for convolutional layers containing small number of model parameters, and model parallelism works best for fully-connected layers seen in CNN, the proposal suggests to parallelize the convolutional layers using data parallelism, and switch to model parallelism for the fully-connected layers present at the end of the network. As shown in FIG. 6 and FIG. 7, a more sophisticated hybrid parallelism strategy according to embodiments presented herein may be used to increase performance.

One dynamic-programming based approach to automatically find optimal schedules for CNNs exploits the following graph property commonly seen in the computation graphs of CNNs: Several of the nodes in the computation graph of a CNN have a single in-edge and a single out-edge. Based on this observation, propose two graph reduction operations—node elimination and edge elimination—to simplify a graph. This approach considers that the optimality is preserved by these reduction operations and uses an efficient dynamic programming-based process for computing optimal strategies for various CNNs. However, the computation graphs of other networks, such as, RNN do not have this special property, and thus the technique fails to reduce the graph efficiently to find an optimal strategy within a reasonable time. In contrast, embodiments disclosed herein are not limited to computation graphs of CNNs and can thus find efficient strategies for various types of networks, such as RNN and DNN4 models, within a few minutes. In addition, embodiments herein define a parallelization configuration to split any dimension in the iteration space. This is significantly different that splitting only the output tensor dimensions, which can heavily restrict the search space since some of the dimensions (such as the reduction k-dimension of GEMM) are not considered possible choices for parallelization.

One approach using Framework1 to automatically find efficient parallelization strategies for various DNNs uses an execution simulator that uses a general Markov Chain Monte Carlo (MCMC) search process to explore the search space to discover the best strategy. The strategy returned by this framework need not necessarily be optimal. While this method takes the whole search space into consideration, embodiments herein may ignore inter-layer pipeline parallelism to, advantageously, find an efficient strategy for various DNNs much faster than Framework1, without being subject to the limitation of getting stuck at a locally minimum solution.

REINFORCE uses machine learning to find efficient device placement for various layers to achieve efficient pipeline parallelism. However, the technique ignores data and model parallelism strategies in the search process. Further, it requires multiple GPUs and takes several hours to find an efficient strategy, while embodiments herein finish within a few minutes. Some approaches use polyhedral compilation techniques to optimize the kernels of individual DNN operators to efficiently execute on GPUs. However, these approaches do not consider parallelization of these kernels on multiple devices. Embodiments may use such techniques orthogonally to further improve the performance within each GPU.

Some of previous efforts apply semantic modifications to the model to expose better pipeline parallelism to improve parallel training. However, these semantic modifications lead to variations in the model accuracy, compared to the original model, and they also might take more epochs to converge, thus, eliminating any advantages obtained from the modifications. In contrast, embodiments herein need not perform semantic modifications to the model. As a result, the convergence rate and the final accuracy may be exactly the same as the original model, providing better hardware utilization through enhanced parallelism.

Several expert-designed strategies have been proposed for different networks based on domain specific knowledge. One suggests a technique for convolution networks, and another proposes a way to achieve good pipeline parallelism for RNNs. However, each network has to be individually analyzed manually to come up with an efficient strategy. Further, these strategies need not be necessarily optimal. In contrast, embodiments presented herein automate this process and can point an expert user towards the right direction for parallelization.

F. Some Conclusions

Presented systems and methods facilitate automatically finding efficient parallelism strategies for DNN applications. Embodiments use a recurrence formulation to compute the minimum cost of a computation graph. Presented are techniques to sequence the vertices in an efficient order that compute, within a few minutes, the best strategy to parallelize the graph. Results are evaluated against data parallelism, expert designed strategies, and the strategies proposed by a deep learning framework, Framework1. Results show that the strategies proposed by various embodiments outperform the standard data parallelism by up to a factor of 4. In addition, the proposed strategies perform better than expert-designed strategies, and strategies proposed by Framework1.

G. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
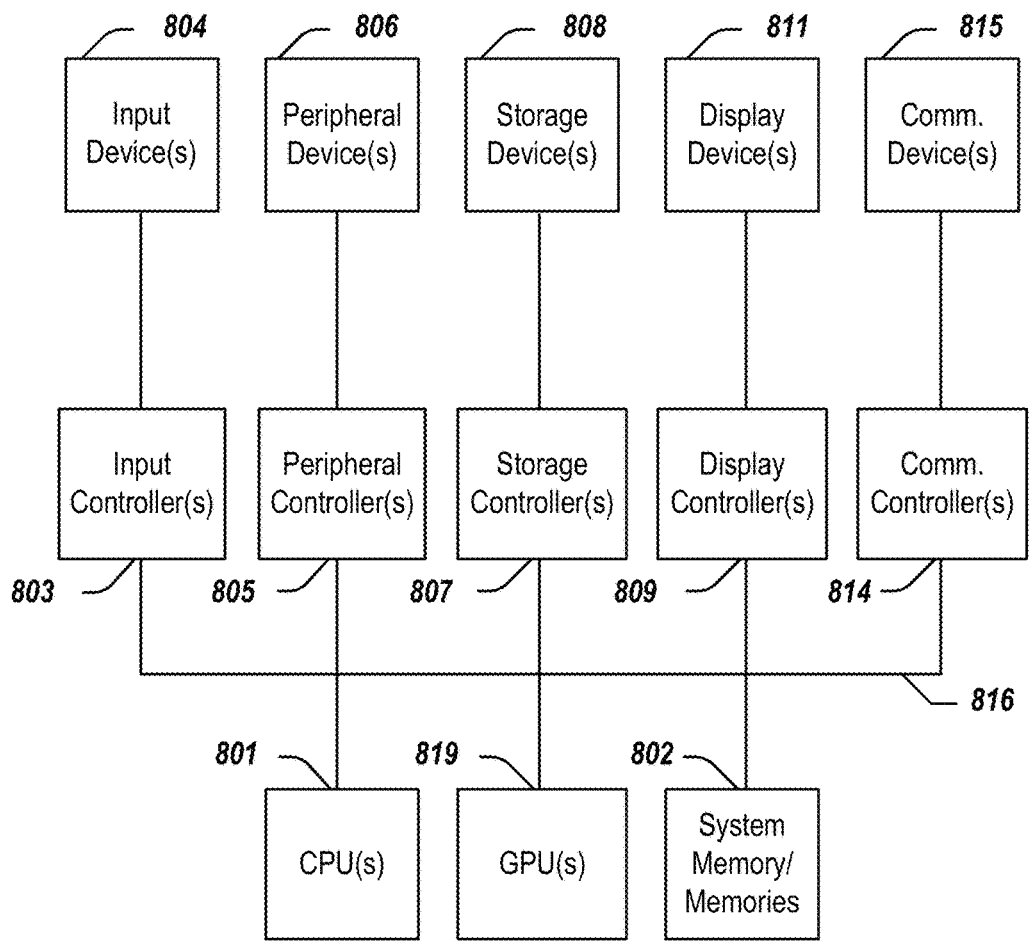
FIG. 8 depicts a simplified block diagram of a computing system, according to embodiments of the present disclosure.

FIG. 8 depicts a simplified block diagram of a computing system according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more central processing units (CPU) 801 that provides computing resources and controls the computer. CPU 801 may be implemented with a microprocessor or the like, and may also include one or more graphics processing units (GPU) 819 and/or a floating-point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, touchscreen, and/or stylus. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT), a thin film transistor (TFT) display, organic light-emitting diode, electroluminescent panel, plasma panel, or other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A non-transitory computer-readable medium or media comprising one or more sequences of instructions which, when executed by at least one processor, causes steps to be performed comprising:
   representing a deep neural network (DNN) as a computation graph, in which a vertex of the computation graph represents a layer of the DNN;
   for one or more vertices in a set of vertices, initializing a right-dependent set of vertices, a terminal set of vertices, and a set of unsequenced vertices;
   for each vertex, performing steps comprising:
      iteratively selecting from the set of unsequenced vertices a vertex having a least right-dependent set cardinality, and assigning the selected vertex to a sequence of vertices; and
      updating the terminal set of vertices and the right-dependent set of vertices such that sizes of the right-dependent set of vertices in a computation graph are correctly maintained;
   outputting the sequence of vertices as an ordered sequence of vertices; and
   training the DNN, in which the layers of the DNN are ordered for training using the ordered sequence of vertices.

2. The non-transitory computer-readable medium or media of claim 1 wherein an edge of the computation graph represents data flow between vertices that are connected by the edge.

3. The non-transitory computer-readable medium or media of claim 1 wherein the computation graph comprises a left-reachable set of vertices defined as being reachable from a vertex through an undirected path.

4. The non-transitory computer-readable medium or media of claim 3 wherein the vertex is associated with one or more valid configurations.

5. A computer-implemented method comprising:
   representing a deep neural network (DNN) as a computation graph, in which a vertex of the computation graph represents a layer of the DNN;
   for one or more vertices in a set of vertices, initializing a right-dependent set of vertices, a terminal set of vertices, and a set of unsequenced vertices;
   for each vertex, performing steps comprising:
      iteratively selecting from the set of unsequenced vertices a vertex having a least right-dependent set cardinality, and assigning the selected vertex to a sequence of vertices; and
      updating the terminal set of vertices and the right-dependent set of vertices such that sizes of the right-dependent set of vertices in a computation graph are correctly maintained;
   outputting the sequence of vertices as an ordered sequence of vertices; and
   training the DNN, in which the layers of the DNN are ordered for training using the ordered sequence of vertices.

6. The computer-implemented method of claim 5 wherein an edge of the computation graph represents data flow between vertices that are connected by the edge.

7. The computer-implemented method of claim 5 wherein the computation graph comprises a left-reachable set of vertices defined as being reachable from a vertex through an undirected path.

8. The computer-implemented method of claim 7 wherein the vertex is associated with one or more valid configurations.

9. A system comprising:
   one or more processors; and
   a non-transitory computer-readable medium or media comprising one or more sets of instructions which, when executed by at least one of the one or more processors, causes steps to be performed comprising:

representing a deep neural network (DNN) as a computation graph, in which a vertex of the computation graph represents a layer of the DNN;

for one or more vertices in a set of vertices, initializing a right-dependent set of vertices, a terminal set of vertices, and a set of unsequenced vertices;

for each vertex, performing steps comprising:
  iteratively selecting from the set of unsequenced vertices a vertex having a least right-dependent set cardinality, and assigning the selected vertex to a sequence of vertices; and
  updating the terminal set of vertices and the right-dependent set of vertices such that sizes of the right-dependent set of vertices in a computation graph are correctly maintained;

outputting the sequence of vertices as an ordered sequence of vertices; and training the DNN, in which the layers of the DNN are ordered for training using the ordered sequence of vertices.

10. The system of claim 9 wherein an edge of the computation graph represents data flow between vertices that are connected by the edge.

11. The system of claim 9 wherein the computation graph comprises a left-reachable set of vertices defined as being reachable from a vertex through an undirected path.

12. The system of claim 11 wherein the vertex is associated with one or more valid configurations.

\* \* \* \* \*